Nov. 5, 1968    R. D. OLSON    3,409,524
ELECTROLYTIC METHOD FOR DEBURRING ANNULAR SHOULDERS
DEFINING MACHINED HOLES
Filed March 23, 1966
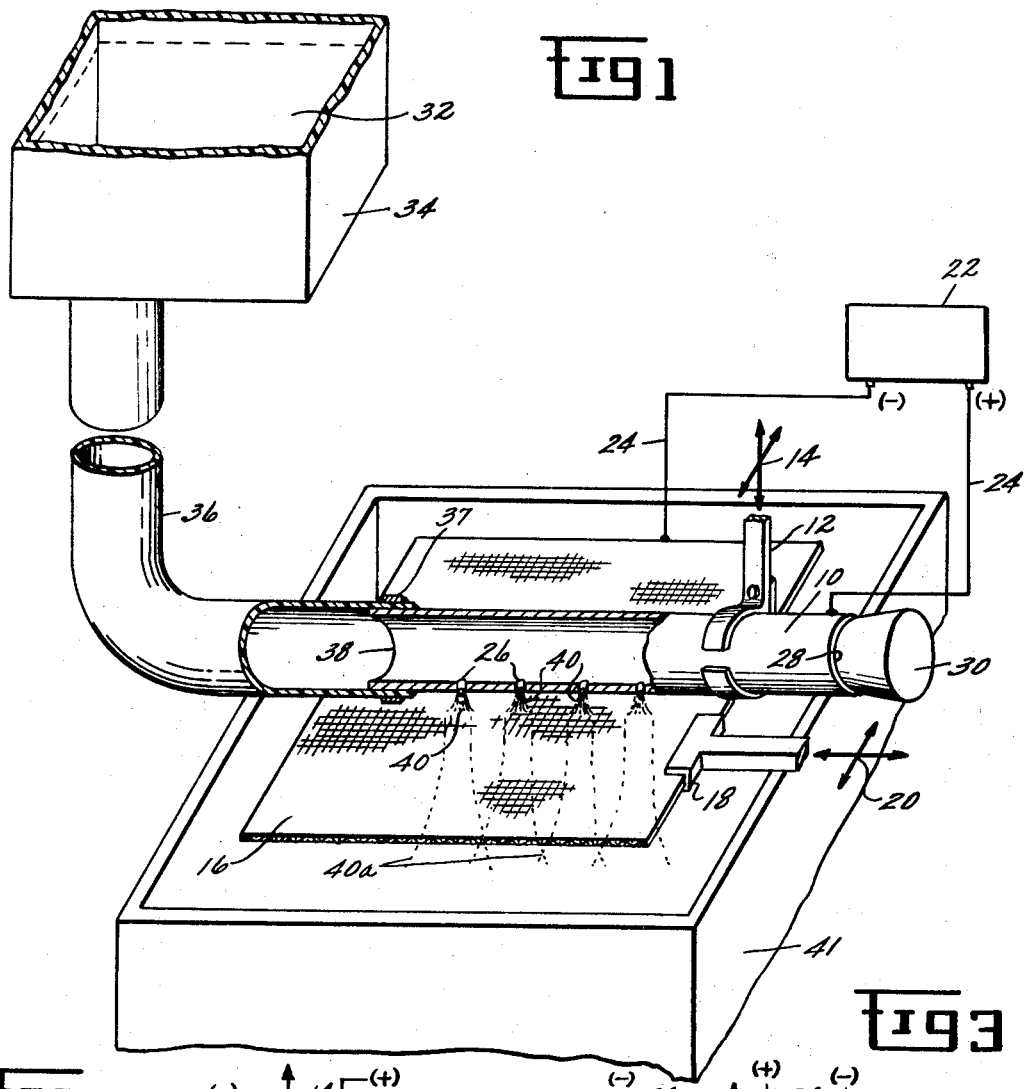
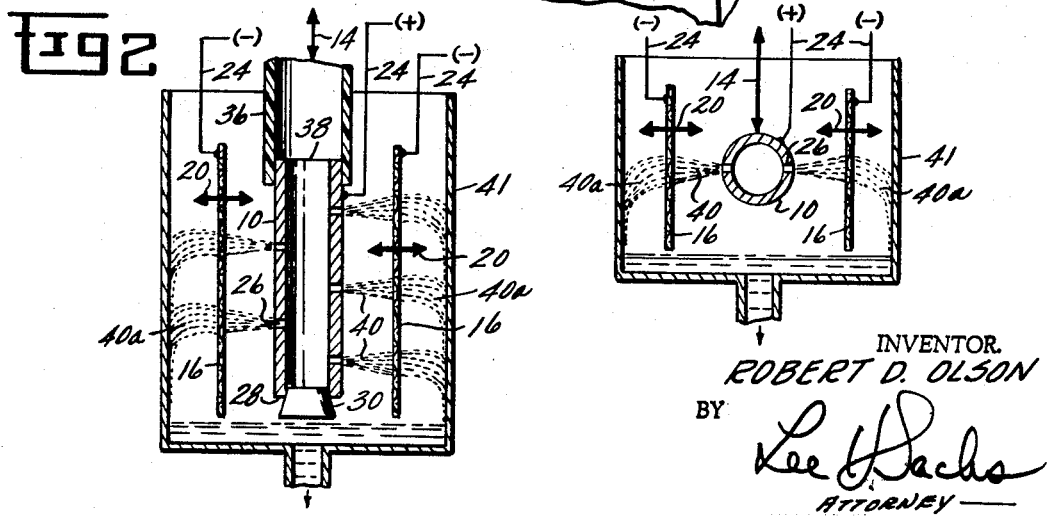
INVENTOR.
ROBERT D. OLSON
BY
Lee Sachs
ATTORNEY

United States Patent Office

3,409,524
Patented Nov. 5, 1968

3,409,524
ELECTROLYTIC METHOD FOR DEBURRING ANNULAR SHOULDERS DEFINING MACHINED HOLES
Robert D. Olson, Cincinnati, Ohio, assignor to General Electric Company, a corporation of New York
Filed Mar. 23, 1966, Ser. No. 536,830
2 Claims. (Cl. 204—143)

This invention relates to electrolytic machining and more particularly to electrolytic machining apparatus and a method for removing electrically conductive material from the periphery of a hole in a workpiece.

Electrolytic machining, including details of various forms of the apparatus and methods of use, has been widely described in published literature. Basically, the method involves the positioning of an appropriately shaped cathode or tool member closely opposite a workpiece to define during operation an electrolytic machining gap. The tool member and the workpiece are connected to an electrical power source of predominantly direct current with the tool cathodic with respect to the workpiece. With electrolyte filling the electrolytic machining gap between the tool and the workpiece, as electric current is passed between the tool and the workpiece, a material removal or "deplating" action occurs at the workpiece or anode.

The electrolytic machining process has been applied to the creation of contours and shapes on the surface of a workpiece as well as to the production of cavities in and holes through a workpiece. In known methods and through the use of the known apparatus, electrolyte has been directed through the space or gap between the tool and workpiece across which electrolytic machining is occurring. This gap, which is referred to herein as the electrolytic machining gap, means a gap across which the tool and workpiece are sufficiently close at the power input of the system to result in material being removed from the anode. In some systems, the electrolyte is directed through the tool and toward the workpiece to create the contours, cavities or holes desired. In other systems, electrolyte is directed into the electrolytic machining gap or the electrodes are both immersed in the electrolyte.

In the production of holes in articles such as holes produced in spray heads from which fuel is ejected in a gas turbine engine, holes produced by mechanical means such as drilling frequently leave burrs around the periphery of the hole. In order to avoid erratic liquid ejection from the holes and to avoid build up of any foreign particles around the periphery of the hole, the burrs must be removed. In other instances where such holes have been created by electrolytic drilling, it is sometimes required for very accurate quality control to enlarge the holes or add more curvature at the periphery of the holes.

It has been suggested that various shaped cathodes be brought in juxtaposition with such holes for deburring electrolytically, with the electrolyte directed toward the workpiece from the cathode-tool or with the workpiece and cathode-tool immersed in an electrolyte bath. However, these types of processes are difficult to control and limit to the periphery of the hole because some current will stray to other parts of the workpiece resulting in an undesirable side effect material removal even though current would tend to concentrate in density at the edges of the holes. It can concentrate as well at other edges which the electrolyte are contacting.

It is a principal object of the present invention to provide an improved method for selectively removing material from the periphery of a hole in a workpiece by electrolytic means while avoiding side action with other portions of the workpiece material.

Another object is to provide electrolytic machining apparatus which will selectively remove material from the periphery of a hole through a workpiece while at the same time avoiding electrolyte effect on other portions of the workpiece.

These and other objects and advantages will be more readily understood from the following detailed description and the drawing in which:

FIG. 1 is a partially schematic, partially sectional isometric view of one form of the apparatus of the present invention practicing its method; and FIGS. 2 and 3 are sectional, partially schematic modifications of the apparatus for use with the workpiece including holes directed in various directions.

It has been recognized that a method which fulfills the above objects for removing electrically conductive material from the periphery of a hole through a workpiece comprises first positioning the workpiece portion including the hole in juxtaposition with an electrically conductive tool across an electrolytic machining gap. Electrolyte is directed through the hole in the workpiece portion from the workpiece toward and in contact with a cathode-tool across the gap while at the same time avoiding return of the electrolyte to the workpiece portion. Concurrently, an electrical potential is applied between the cathode-tool and the workpiece so that the workpiece is anodic with respect to the cathode-tool and sufficient electrical current, primarily direct current, is passed between the cathode-tool and the workpiece through the electrolyte to remove material electrolytically from the workpiece portion.

The electrolytic machining apparatus of the present invention such as can be used in the above method comprises a workpiece holding and positioning means, a source of electrolyte and means to direct the electrolyte from the source of electrolyte through the hole in the workpiece held by the workpiece holder. The electrolyte is directed toward and in contact wtih the cathode-tool. The cathode-tool has a tool surface substantially free of any portion deflecting electrolyte back into contact with the workpiece. The apparatus includes a cathode-tool holding and positioning means to locate the cathode-tool surface in juxtaposition with the hole in the workpiece across an electrolytic machining gap. There is an electrical power source of primarily direct current and electrical conductor means from the power source connected between the tool and the workpiece whereby the workpiece is predominantly anodic with respect to the tool during electrolytic operation.

In FIG. 1, a workpiece 10, shown as a tube, is held by a workpiece holding and positioning means such as electrically insulated clamp 12. That means is movable, for example as indicated by arrows 14, with respect to a cathode 16 which in the drawing is shown in its preferred form as a screen. As used in this specification, the term "screen" means a highly porous electrically conductive material or network through which electrolyte can readily pass. Cathode 16 is held by a cathode-tool holding and positioning means such as an electrically insulated clamping fixture 18. The cathode holding and positioning means can be movable, for example, as shown schematically by arrows 20. Thus the workpiece 10 through its holding and positioning means 12 and cathode 16 through its holding and positioning means 18 can be movable relative to one another in order to adjust their positions and the size of the electrolytic machining gap between them. In the drawing, the electrolytic machining gap would be the closest spacing between the workpiece 10 and the tool 16.

An electric power source 22, FIG. 1, of predominantly direct current, such as a direct current rectifier, is connected between workpiece 10 and cathode 16 through an electrical conductor means such as wires 24. The workpiece 10 is connected so that it is anodic with respect to the cathode-tool 16.

A hole or a plurality of holes 26 from the periphery of which electrically conductive material is to be removed is placed in juxtaposition with cathode-tool 16 across an electrolytic machining gap. It has been recognized according to the present invention that if electrolyte can be directed from workpiece 10 through holes 26 and toward cathode-tool 16, preferential electrolytic machining can be concentrated at the periphery of the holes provided the cathode is constructed to be substantially free of surfaces which would deflect the electrolyte back toward the workpiece 10. It is believed that because the electrolyte is moving rapidly through the holes 26, electrolyte film resistance at the periphery of the holes is reduced, for example, because products of reaction are being removed more quickly and an electrically resistant film is thinner at that point.

In order to direct electrolyte through the hole or holes desired to be electrolytically machined according to the present invention, other openings through the workpiece such as at open end 28 of workpiece 10 are plugged or stopped such as with a cap or a plug 30. Electrolyte 32 from an electroylte source shown generally at 34 in FIG. 1 is directed through a means such as conduit or hose 36 secured to workpiece 10 such as with clamp 37. Thus electrolyte is directed or forced such as with a pump (not shown) into the interior of hollow tube-workpiece 10 such as through end 38. The electrolyte then passes as a stream 40 through holes 26 across the electrolytic machining gap, toward and in contact with cathode 16.

It will be appreciated that the present invention can be used with a workpiece which is not a hollow member such as a tube as shown in the drawings. If the workpiece is in some other form, for example, a plate or open cup through which there are holes, the electrolyte can be directed through the holes such as by mounting the workpiece as the bottom member of a manifold or chamber. Also, conduit 36 or a plurality of conduits 36 from source of electrolyte 34 can direct electrolyte individually through holes 26.

As was mentioned above, the cathode in the form of a screen 16 is the specifically preferred arrangement to avoid deflection or splash-back of the electrolyte toward the workpiece. When an electrolyzed screen is used, as shown in the drawing, each electrolyte stream 40 from holes 26 is broken into a plurality of smaller streams or droplets shown generally at 40a, passing away from workpiece 10 or falling into receptacle 41. Thus electrolytic machining action is concentrated at the periphery of holes 26 without effect on other electrically conductive portions of the workpiece.

In certain embodiments, it will be recognized that cathode 16 can be cylindrical, enveloping workpiece 10 with an electrolyzed screen so that holes in a variety of positions and sizes can be electrolytically enlarged or deburred at the same time. FIGS. 2 and 3, in which numerals are used to refer to components like those of FIG. 1, represent some variations in the apparatus of this invention. However, as pointed out above, the cathode tool may be designed to conform to any configuration permitting the flow of electrolyte to proceed along any path or paths which do not permit recontacting the workpiece.

In one specific example, a 0.02″ outside diameter tube of a nickel base alloy, sometimes referred to as IN 102 nickel base alloy having a nominal composition of, by weight, 0.1% (max.) C; 15% Cr; 3% Cb; 3% Mo; 3% W; 7% Fe; 0.5% Al; 0.6% Ti; 0.006% B, with the balance Ni and incidental impurities was arranged as shown in the drawing in juxtaposition with an electrolyzed screen connected as a cathode. In this specific example, the electrolyte was placed under a pressure of about 25 p.s.i.g. through the use of a pump. An aqueous electrolyte of 10 weight percent sulfuric acid was used at a temperature of about 100° F. A direct current of 25–27 amps was passed between the cathodic screen and the anodic workpiece at a potiential of 11 volts.

As was mentioned above, one use for the method and apparatus of the present invention is to remove burrs from holes such as in spray heads. However, if the holes were initially placed in the article by electrolytic drilling no burrs would exist. Nevertheless, for critical applications, there may be sufficient deviation from a desired size to warrant an increase in dimensions for quality control purposes. By adjusting the parameters of voltage, current, flow rate, type and concentration of electrolyte and distance between the workpiece and the cathode, a variety of cutting rates can be attained. The following table shows some changes of flow capacity of holes through a workpiece of the type and under the conditions described in the specific example above.

TABLE.—WATER FLOW TEST

| Holes | Time Holes Treated (min.) | Test Water | | Flow Change (percent) |
| --- | --- | --- | --- | --- |
| | | Flow (lbs./hr.) | Pressure (p.s.i.g.) | |
| 8 | 0 | 575 | 150 | |
| 8 | 2 | 582 | 150 | 1.3 |
| 8 | 12 | 620 | 150 | 7.3 |
| 6 | 0 | 473 | 150 | |
| 6 | 2 | 480 | 150 | 1.5 |
| 4 | 0 | 241 | 150 | |
| 4 | 1 | 250 | 150 | 3.6 |
| 4 | 3 | 253 | 150 | 4.7 |
| 8 | 0 | 344 | 50 | |
| 8 | 2 | 350 | 50 | 4.0 |
| 8 | 10 | 360 | 50 | 4.7 |
| 6 | 0 | 282 | 50 | |
| 6 | 2 | 283 | 50 | 0.3 |
| 4 | 0 | 141 | 50 | |
| 4 | 1 | 144 | 50 | 2.1 |
| 4 | 3 | 147 | 50 | 4.2 |

The data of the above table compares the time various numbers of holes in a workpiece were treated at the same time to enlarge them according to the present invention. Also shown are the associate water flow rate and rate change during subsequent water flow quality control testing at several water pressures. From these data curves can be prepared for various workpiece configurations for reworking according to this invention to the quality level desired.

Although the present invention has been described in connection with specific examples and embodiments, it will be understood by those skilled in the arts involved the variations and modifications of which this invention is capable. The appended claims are intended to cover such equivalents.

What is claimed is:

1. In a method for removing electrically conductive material from a workpiece portion defining the periphery of at least one hole through the workpiece portion, the steps of:

positioning the workpiece portion in juxtaposition with an electrically conductive tool electrode configured to permit electrolyte flowing from said hole to proceed along any paths which do not permit the electrolyte to recontact the workpiece and spaced to define an electrolyte machining gap;

directing electrolyte through the hole in the workpiece portion from the workpiece toward and in contact with the tool to cause a continuous stream of electrolyte across the gap without recontacting the workpiece, and at the same time, applying an electrical potential between the tool and the workpiece portion so that the workpiece portion is predominantly anodic with respect to the tool while passing through the electrolyte sufficient electrical current between the tool and the workpiece portion to remove material electrolytically from the workpiece portion at the periphery of the hole.

2. The method of claim 1 wherein said tool electrode is an electrically conductive screen.

References Cited

UNITED STATES PATENTS

| 2,989,445 | 6/1961 | Lloyd et al. | 204—206 |
| 3,384,563 | 5/1968 | Taylor | 204—143 |

ROBERT K. MIHALEK, *Primary Examiner.*